United States Patent
Omori

(10) Patent No.: US 8,632,128 B2
(45) Date of Patent: Jan. 21, 2014

(54) VEHICLE SEAT

(75) Inventor: Misao Omori, Tochigi-ken (JP)

(73) Assignee: TS Tech Co., Ltd., Saitama-Ken (JP)

( * ) Notice: Subject to any disclaimer, the term of this patent is extended or adjusted under 35 U.S.C. 154(b) by 703 days.

(21) Appl. No.: 12/377,962

(22) PCT Filed: Aug. 20, 2007

(86) PCT No.: PCT/JP2007/066139
§ 371 (c)(1),
(2), (4) Date: Feb. 6, 2011

(87) PCT Pub. No.: WO2008/020647
PCT Pub. Date: Feb. 21, 2008

(65) Prior Publication Data
US 2011/0148164 A1    Jun. 23, 2011

(30) Foreign Application Priority Data

Aug. 18, 2006 (JP) .................................. 2006-223686

(51) Int. Cl.
*B60N 2/02* (2006.01)
*B60N 2/00* (2006.01)
(52) U.S. Cl.
USPC ...................................... 297/341; 297/354.13

(58) Field of Classification Search
USPC ............ 297/341, 378.12, 367 R, 342, 354.13
See application file for complete search history.

(56) References Cited

U.S. PATENT DOCUMENTS 6,561,584 B1 * 5/2003 Schwarz et al. .......... 297/367 R
2003/0085603 A1 * 5/2003 Lee et al. ...................... 297/367

FOREIGN PATENT DOCUMENTS

| JP | H0727351 U | * | 5/1995 |
| JP | 2004155228 A | * | 6/2004 |
| JP | 2004173922 A | * | 6/2004 |
| JP | 2005103137 A | * | 4/2005 |

* cited by examiner

*Primary Examiner* — Milton Nelson, Jr.
(74) *Attorney, Agent, or Firm* — Browdy and Neimark, PLLC

(57) ABSTRACT

A vehicle seat includes a reclining mechanism having a lock member, which is engaged with a ring member when it is pressed by a cam body, and a walk-in mechanism. A rotating arm, which is rotated by operation of a reclining lever or a walk-in lever, is secured to a center shaft. The reclining lever operates the rotation of the rotating arm by a link lever having a slot. The walk-in lever operates the rotation of the rotating arm independently of the reclining lever. When a seatback is tilted forward by the operation of the walk-in lever, the slide mechanism of the vehicle seat is unlocked, and the entire seat is moved forward.

9 Claims, 11 Drawing Sheets

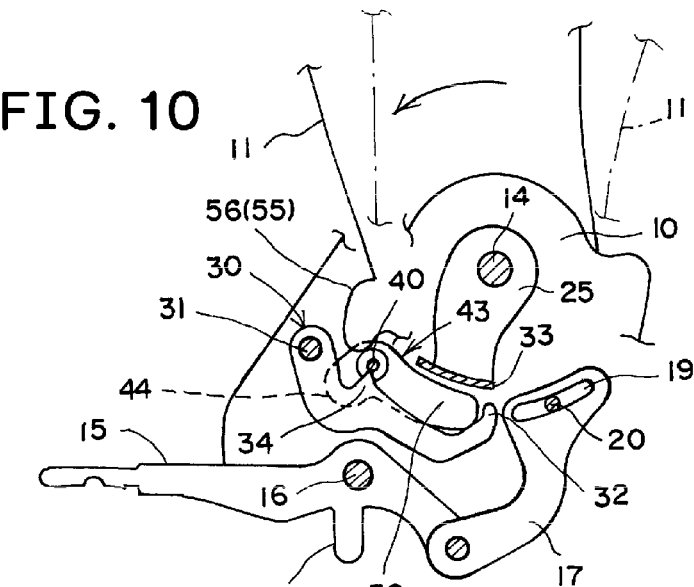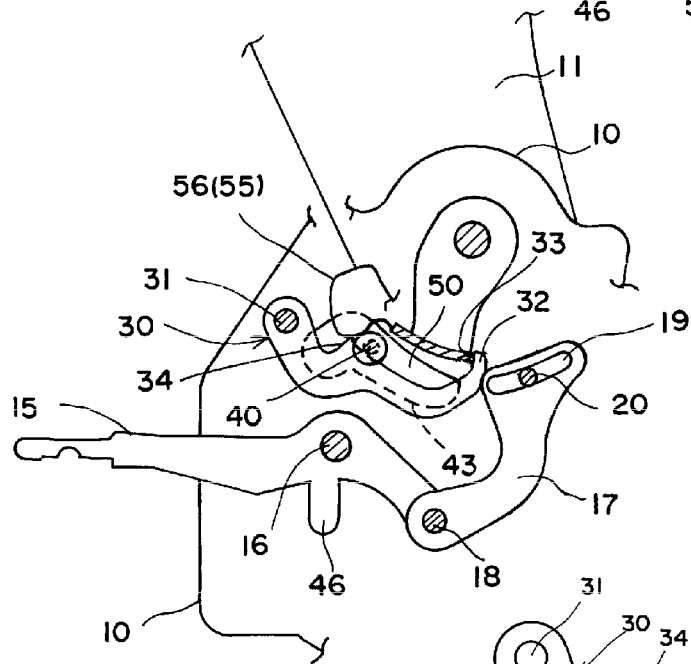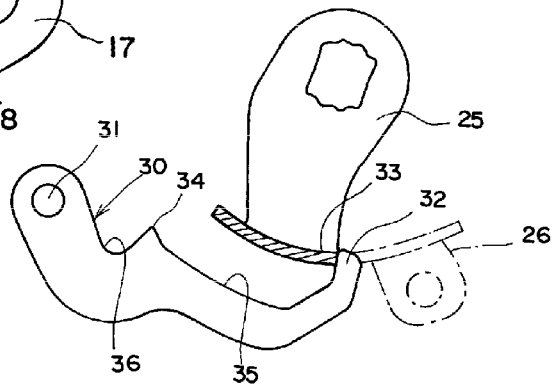

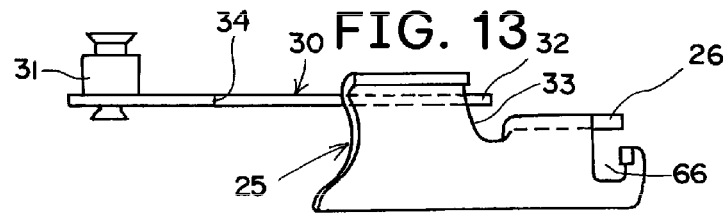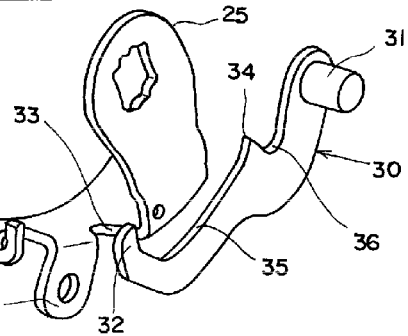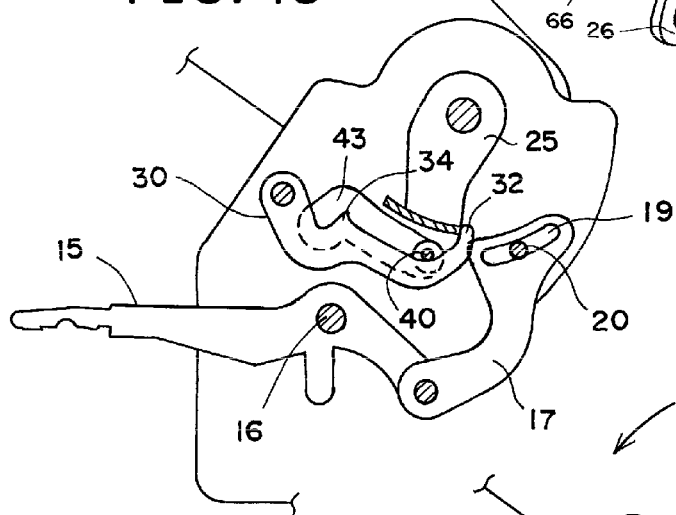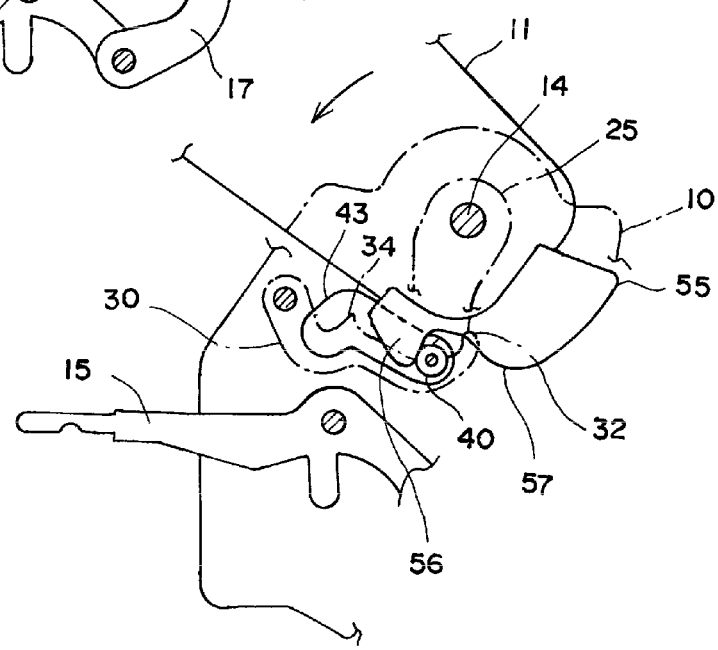

VEHICLE SEAT

TECHNICAL FIELD

The present invention relates to a vehicle seat, and in particular, to a vehicle seat having a walk-in device which moves a vehicle front seat forward to create a space allowing easier getting in and out, between the vehicle front seat and the vehicle rear seat.

BACKGROUND ART

A reclining mechanism of a vehicle seat according to the related art includes a perfectly circular ring member with an arc gear formed on the inner circumference thereof and a lock member including a lock gear unit engaging with the inside of the arc gear. The lock member is secured to a center shaft. It enters a locked state if it is pressed by a cam unit disposed in the ring member and thus engages with the arc gear but enters an unlocked state if the lock member is separated from the ring member.

Also, there is also known a vehicle seat in which a walk-in mechanism is operationally connected to the reclining mechanism and a vehicle seat can move forward if a seatback is tilted forward to release a locked state of a slide mechanism.

Moreover, in the related art, there is known a reclining apparatus with a memory mechanism, in which, when a seatback in a forward tilted state is rotated backward, the rotation is stopped if the seatback returns to its original state.

Patent Document 1: JP 2004-155228A1
Patent Document 2: JP 2005-103137A1
Patent Document 3: JP 2004-173922A1

DISCLOSURE OF THE INVENTION

Among the above-described well-known examples, an example of JP-A No. 2004-155228 does not include a memory mechanism returning a forward tilted seatback to an original predetermined tilt position. Further, it is impossible to tilt only the seatback forward. That is, if the seatback is operated to tilt forward, a locked state of a slide mechanism is released so that a vehicle seat moves forward. For this reason, it is impossible to tilt only the seatback forward.

A reclining mechanism of JP-A No. 2005-103137 includes a memory mechanism returning a forward tilted seatback to an original predetermined tilt position. However, since most of the components of the reclining mechanism are individually installed to a backrest frame, there is a problem in which an installation space is large.

A reclining mechanism of JP-A No. 2004-173922 also includes a memory mechanism therein. However, this reclining mechanism with the memory mechanism is problematic in that it has a complicated structure, is expensive, and is large in size.

Therefore, an object of the present invention is to provide a vehicle seat capable of including a reclining mechanism, a walk-in mechanism, and a memory mechanism in a reasonable configuration.

BRIEF DESCRIPTION OF THE DRAWINGS

FIG. 10 is a side view illustrating a state in which the seatback is tilted slightly forward from the state of FIG. 9.
FIG. 11 is a side view illustrating a state in which the seatback is further tilted forward from the state of FIG. 10 so that a memory hook of a memory lever is engaged with an unlock engagement surface of the rotatable arm.
FIG. 12 is an enlarged side view illustrating the memory lever and the rotatable arm in the state of FIG. 11.
FIG. 13 is a plan view of FIG. 12.
FIG. 14 is a perspective view of FIG. 12.
FIG. 15 is a side view illustrating a state in which the seatback of the vehicle seat is tilted forward.
FIG. 16 is a side view illustrating a position of an abutting member in the state of FIG. 15.

BEST MODE FOR CARRYING OUT THE INVENTION

Figure 1:
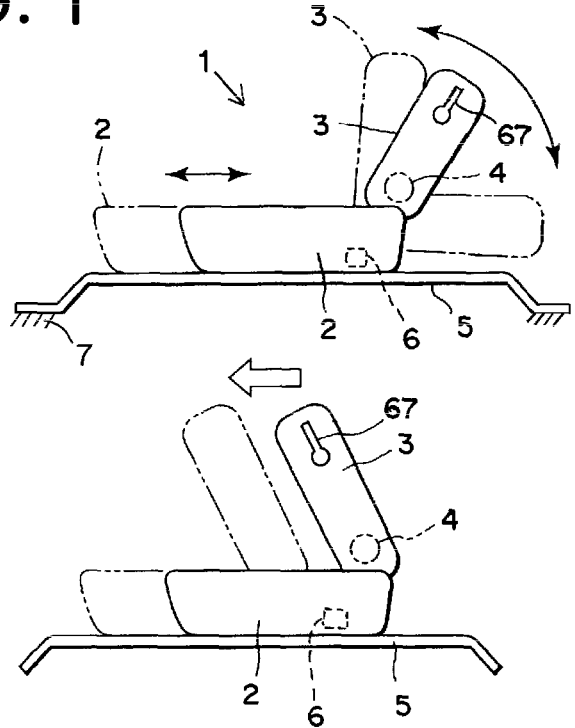
FIG. 1 is a schematic side view illustrating a vehicle seat according to the present invention.

An embodiment of the present invention will be described with reference to the drawings. A vehicle seat 1 according to the present invention includes a seat bottom 2 installed to a vehicle body 7 by a slide mechanism 5 to be slidable forward and backward and a seatback 3 installed to the seat bottom 2 by a reclining mechanism 4 to be adjustable in angle.

The vehicle seat 1 further includes a walk-in mechanism 6. The walk-in mechanism 6 is generally installed in a front seat and moves the front seat forward in a sliding manner by elasticity of a spring if it is operated. This widens a gap between the front seat and a rear seat, thereby making it easier for a rear passenger to get in or out of the rear seat.

Figure 2:
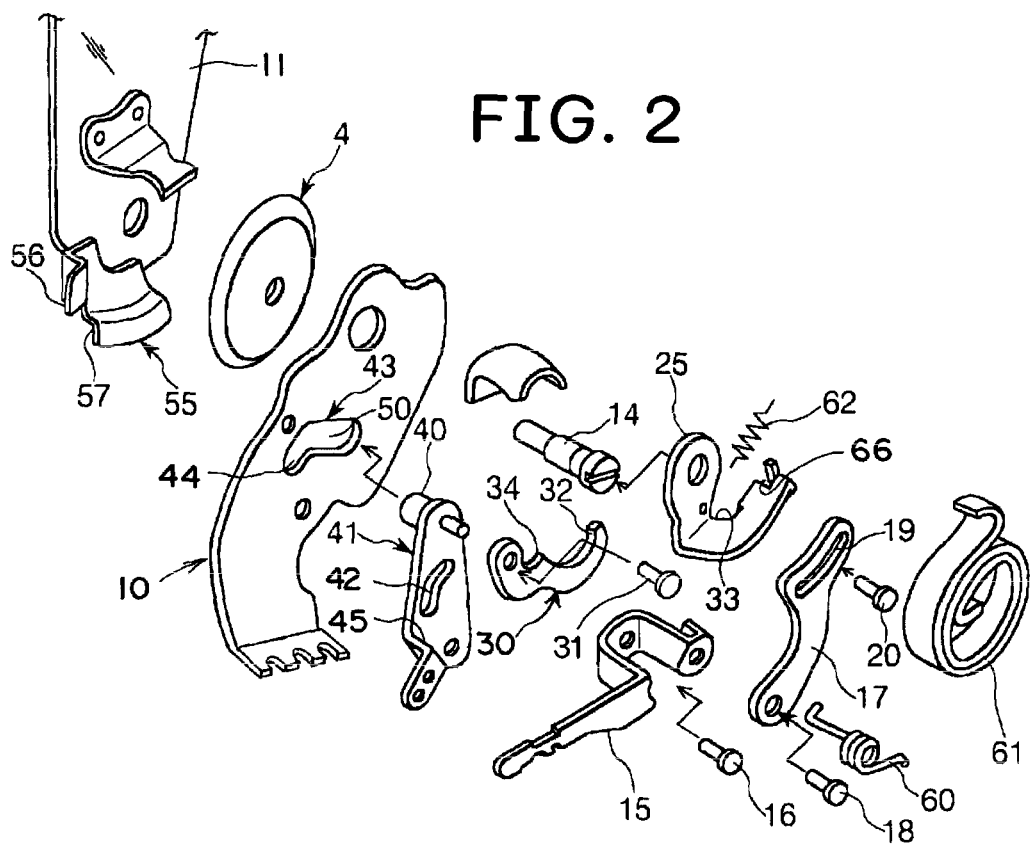
FIG. 2 is an exploded perspective view illustrating a walk-in mechanism according to the present invention.
Figure 3:
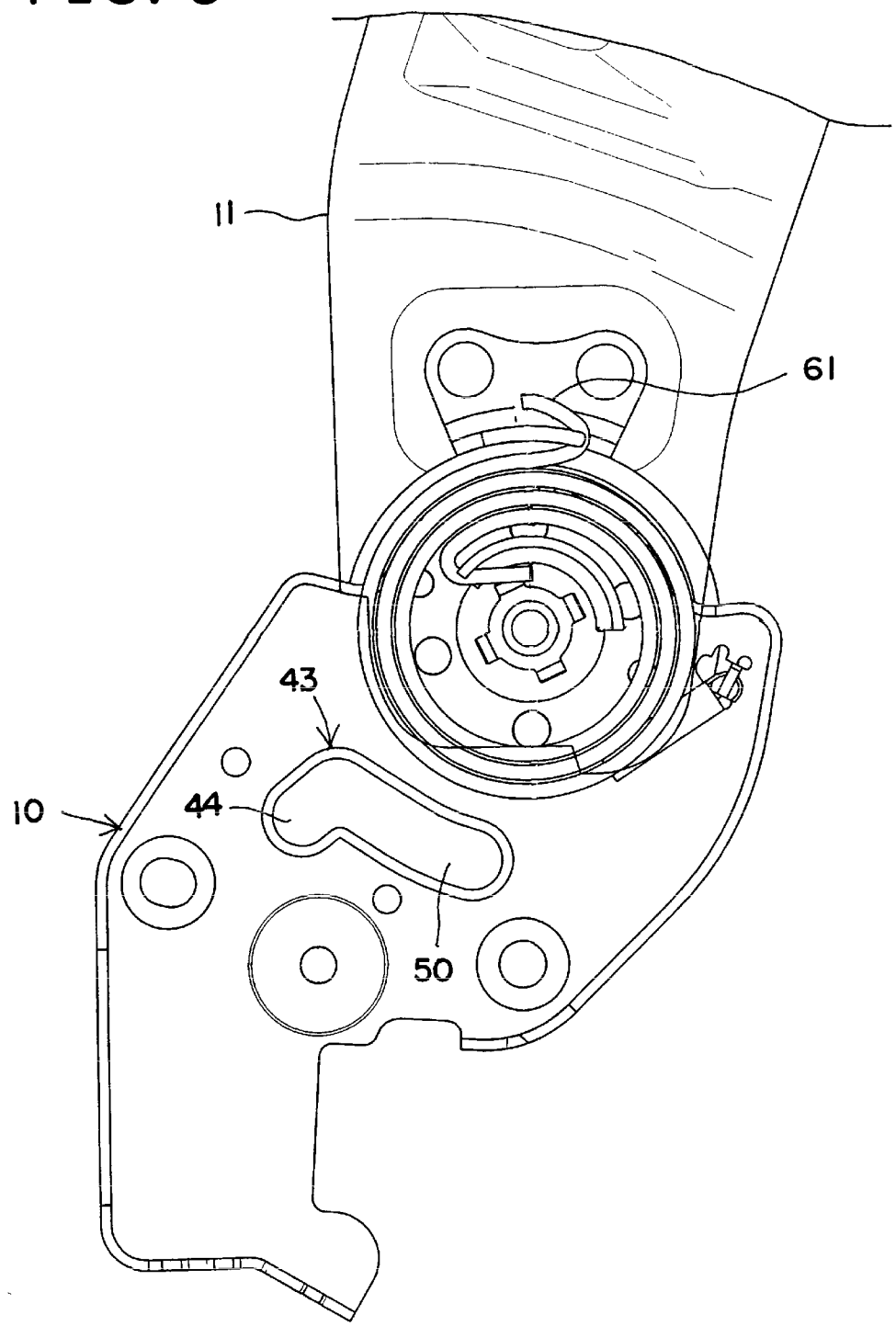
FIG. 3 is a side view illustrating a bottom bracket and a seatback bracket of the vehicle seat.
Figure 4:
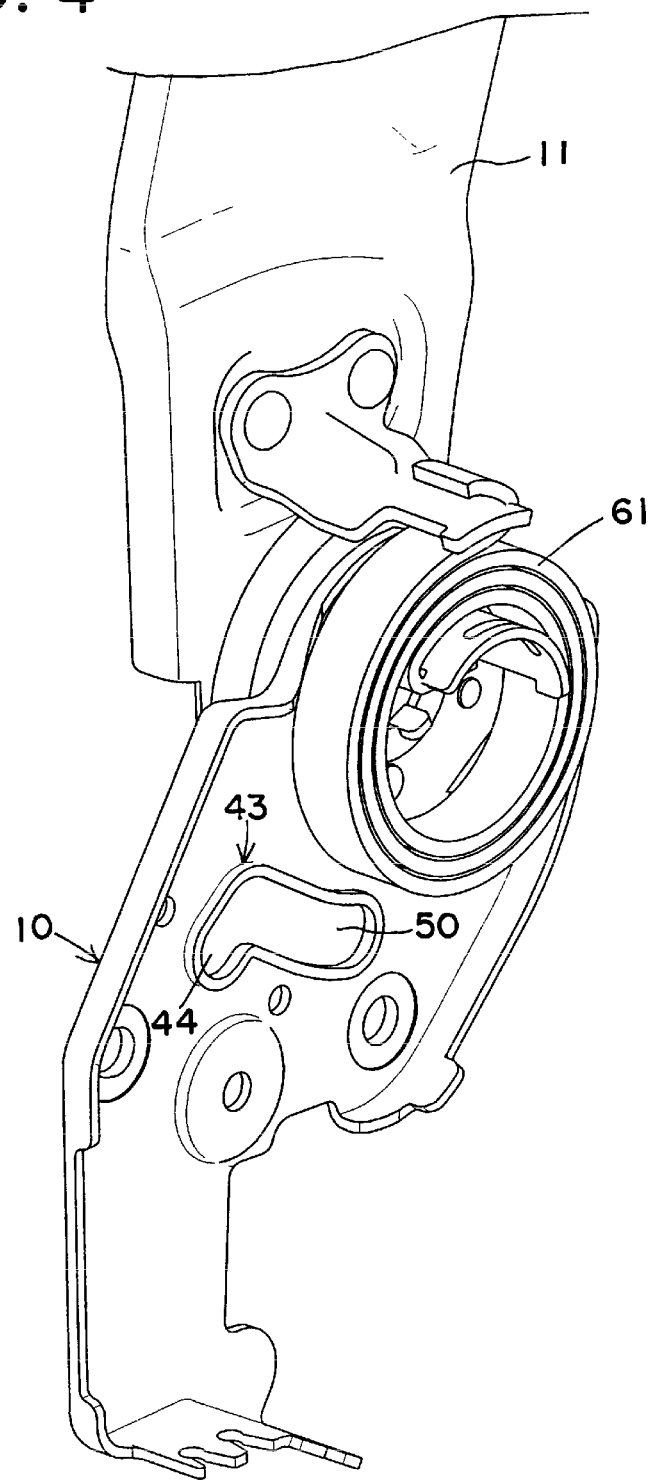
FIG. 4 is a perspective view illustrating the bottom bracket and the seatback bracket.

As shown in FIGS. 2 to 4, the seat bottom 2 includes a bottom bracket or bottom frame 10. A seatback bracket or seatback frame 11 of the seatback 3 is installed to the bottom bracket 10 to be rotatable by a center shaft 14. A relative angle between the bottom bracket 10 and the seatback bracket 11 is generally maintained or locked by the reclining mechanism 4. The reclining mechanism 4 includes a reclining lever 15. If the reclining lever 15 is manipulated, the reclining mechanism 4 is changed from a locked state to an unlocked state, which makes it possible to recline the seatback 3 with respect to the seat bottom 2.

The reclining lever 15 is installed to the bottom bracket 10 to be rotatable by a lever shaft 16. One end of a link lever 17 is installed to the reclining lever 15 by a shaft 18. The other end of the link lever 17 is provided with a long slot 19.

A rotatable arm 25 is fixed to the center shaft 14. Therefore if the rotatable arm 25 rotates, the center shaft 14 also rotates. The shape of the rotatable arm 25 is well illustrated in FIGS. 12 to 14, and a shaft 20 inserted into the slot 19 of the link lever 17 is connected to a bent portion 26 of the rotatable arm 25. If a walk-in lever 67 of the walk-in mechanism 6 is manipulated, the rotatable arm 25 rotates clockwise by means of a cable 65 as described below. If the rotatable arm 25 rotates clockwise from the position of FIG. 5 by the manipulation of the walk-in lever 67, the reclining mechanism 4 enters the unlocked state.

A memory lever 30 is installed to the bottom bracket 10 to be rotatable by a shaft 31. If the rotatable arm 25 rotates clockwise, a memory hook 32 formed at the leading end of the memory lever 30 engages with an unlock engagement surface 33 of the rotatable arm 25 to keep the unlocked state of the reclining mechanism 4. The memory lever 30 includes a cam protrusion 34 and cam surfaces 35 and 36.

A switch lever 41 is installed to the bottom bracket 10 by the lever shaft 16 to be rotatable. The lever shaft 16 is inserted into an installation hole 42 of the switch lever 41. The switch lever 41 includes a pin-shaped switch operation portion 40. The switch operation portion 40 causes the memory lever 30 to disengage from the rotatable arm 25. The switch operation portion 40 engages with a bent hole 43 of the bottom bracket 10 to be slidable. The bent hole 43 has an L-shape and includes an engagement hole 44 and a guide hole 50.

If being brought into contact with the cam protrusion 34 of the memory lever 30, the switch operation portion 40 presses the memory lever 30 downward so as to release the memory hook 32 from the unlock engagement surface 33 of the rotatable arm 25, thereby returning the reclining mechanism 4 from the unlocked state to the locked state.

The switch lever 41 includes an operation restriction surface 45 for moving the switch operation portion 40 to the engagement hole 44 of the bent hole 43. A restriction protrusion 46 provided to the reclining lever 15 can be brought into contact with the operation restriction surface 45.

The guide hole 50 of the bent hole 43 extends in a substantial arc shape about the center shaft 14. The engagement hole 44 extends from a front end of the guide hole 50 in the radial direction of the center shaft 14.

An abutting member 55 moving the switch operation portion 40 is provided in the seatback bracket 11. If the seatback 3 tilts forward, an operation protrusion 56 of the abutting member 55 is brought into contact with the switch operation portion 40 so as to move the switch operation portion 40 in the guide hole 50 of the bent hole 43. A returning protrusion 57 is provided in the abutting member 55, and the returning protrusion 57 moves the switch operation portion 40 in the guide hole 50 to the left side of FIG. 17.

In this case, since the switch lever 41 rotates on the lever shaft 16 and the abutting member 55 rotates on the center shaft 14, the switch lever 41, the abutting member 55, and the bent hole 43 are disposed relative to one another so that the abutting member 55 may move the switch operation portion 40 in the guide hole 50 of the bent hole 43.

Reference numeral 60 denotes a spring that applies a force to the memory hook 32 of the memory lever 30 so that the memory hook engages with the unlock engagement surface 33 of the rotatable arm 25, reference numeral 61 denotes a spring that applies a force to the seatback 3 so that the seat back tilts forward, and reference numeral 62 denotes a spring that applies a force to the rotatable arm 25 in a locking direction. One end of the cable 65 is engaged with an engagement portion 66 of the rotatable arm 25. The other end of the cable 65 is connected to the walk-in lever 67 provided at a desired position of the vehicle seat 1.

The walk-in mechanism 6 is configured to include the memory lever 30, the switch operation portion 40, the bent hole 43 of the bottom bracket 10, and the abutting member 55 and releases the locked state of the reclining mechanism 4 so that the seatback 3 tilts forward. It then releases the lock state of the slide mechanism 5 to allow the whole seat to move forward. Moreover, the memory lever 30, the switch operation portion 40, the bent hole 43 of the bottom bracket 10, and the abutting member 55 serve together as a memory mechanism returning the forward tilted seatback to an original predetermined tilt position at the time of returning to the original position.

An example of the reclining mechanism 4 has a fitting and supporting member 70. The fitting and supporting member 70 has bulging portions 71, 71 that bulge laterally. The bulging portion 71 includes a linear guide portion 72 and a supporting arc portion 73, and further includes a lock slide recess 75, in which a slide lock member 74 slides, between a linear guide portion 72 and another linear guide portion 72.

A lock gear unit 76 is formed on one surface of the slide lock member 74 in a slide direction, and a cam hole 77 with an opening formed in a substantially circular shape in the front or rear portion thereof is formed in the middle portion of the slide lock member 74. A cam unit 78 is fit into the cam hole 77 and the cam unit 78 is fixed to the center shaft 14.

A perfectly circular fitting hole 81 of a ring member 80 is fitted on the outer circumference of each of the individual supporting arc portions 73 of the bulging portions 71, 71. An arc gear 83 with which and from which the lock gear unit 76 of the slide lock member 74 engages and disengages is formed in the inner circumference surface of the fitting hole 81.

It is possible to configure the reclining mechanism 4 of the seat with the fitting and supporting member 70 and the ring member 80. However, in this embodiment, a guide member 84 which also serves as an opposite fitting and supporting member is provided on the outside of the ring member 80, and the ring member 80 is interposed between the fitting and supporting member 70 and the guide member 84 which also serves as an opposite fitting and supporting member, thereby completing the reclining mechanism 4 so as to facilitate installation and assembly.

If the reclining lever 15 is manipulated to rotate on the center shaft 14, the reclining lever 15 rotates the cam unit 78 such that the cam unit 78 is brought into contact with the cam hole 77 of the slide lock member 74 and the slide lock member 74 slides in the lock slide recess 75 between the bulging portions 71, 71 in a direction in which it gets away from the arc gear 83, thereby unlocking the reclining mechanism 4. Then, if the tilt angle of the seatback 3 is adjusted and the reclining lever 15 is released, the cam unit 78 rotates in the locking direction by a spring (not illustrated) such that the slide lock member 74 slides in the lock slide recess 75 and the lock gear unit 76 of the slide lock member 74 is engaged with the arc gear 83, whereby locking the reclining mechanism 4.

Further, if the slide lock member 74 moves in the lock slide recess 75 such that the reclining mechanism 4 is unlocked to make the seatback 3 freely rotatable, the seatback 3 rotates backward by the spring 61 so that it returns to a predetermined tilt position that is a state before a walk-in state.

The configuration of the slide mechanism 5 may be arbitrary. However, in an example to be provided below, reference numeral 90 denotes a slide rail of the slide mechanism 5, an upper rail 92 is installed to a lower rail 91 fixed to the vehicle body 7 to be slidable forward and backward, and lock portions 93 provided in the upper rail 92 can be engaged with and disengaged from a plurality of engagement portions 94 provided in parallel with one another in the front and rear portions of the lower rail 91.

The lock portions 93 are formed in a rear portion of a rotatable arm 95 in the forth-back direction, a middle portion of the rotatable arm 95 is installed to the upper rail 92 by a shaft 96 to be rotatable, and a slide operation lever (not illustrated) is provided on the front side of the rotatable arm 95.

An end of an unlock switch member 98 is brought into contact with an engagement surface 97 of the rear end of the rotatable arm 95. If the unlock switch member 98 rotates in conjunction with the walk-in mechanism 6 such that the unlock switch member 98 is separated from the top surface of the rear end of the rotatable arm 95, the lock portions 93 rotate on the shaft 96 upward so as to be engaged with the engagement portions 94, whereby locking the slide mechanism 5. If the unlock switch member 98 presses the top surface of the rear end of the rotatable arm 95, the lock portions 93 rotate on the shaft 96 downward so as to be separated from the engagement portions 94, thereby unlocking the slide mechanism 5, resulting in the walk-in state. Further, if the seatback 3 slides backward from the forward tilted state and returns to a seating state at a desired position, the slide mechanism 5 returns to a slide lock state.

If the walk-in lever 67 provided at a desired position of the seatback 3 is manipulated, first, the reclining mechanism 4 enters the unlocked state such that the seatback 3 tilts forward, and then, the forward tilting of the seatback 3 releases the lock of the slide mechanism 5 and thus the whole seat advances, thereby forming a space allowing people to get in and out between the seat that has advanced and a rear side vehicle seat 1, resulting in the walk-in state.

Figure 5:
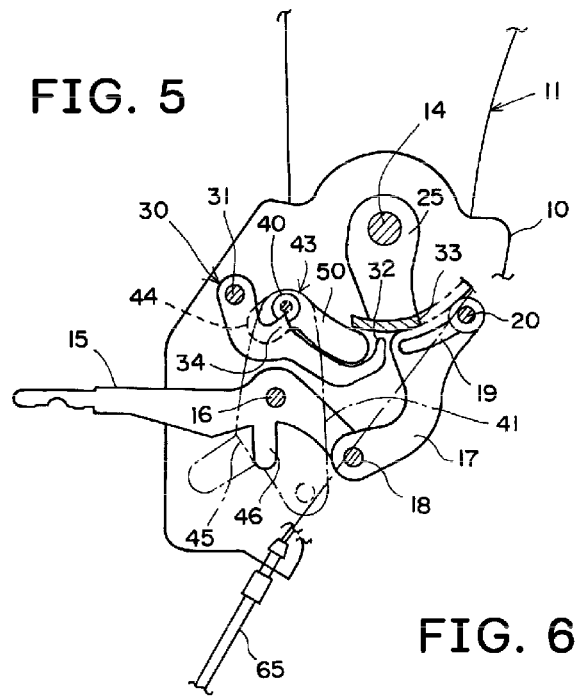
FIG. 5 is a side view illustrating a state in which the seatback of the vehicle seat is standing up.
Figure 6:
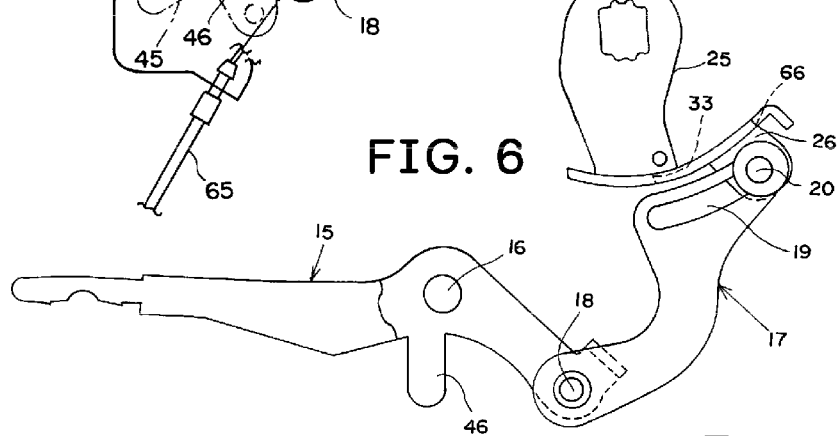
FIG. 6 is a side view illustrating a rotatable arm when the seatback is standing up.
Figure 7:
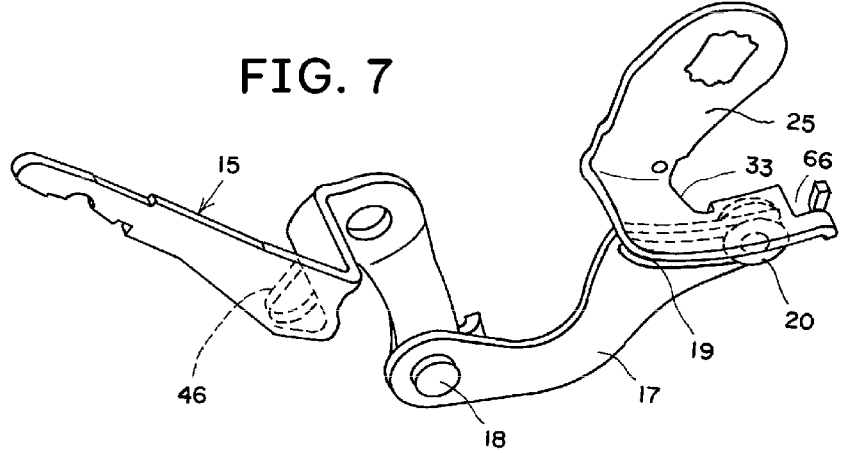
FIG. 7 is a perspective view illustrating the rotatable arm when the seatback is standing up.
Figure 8:
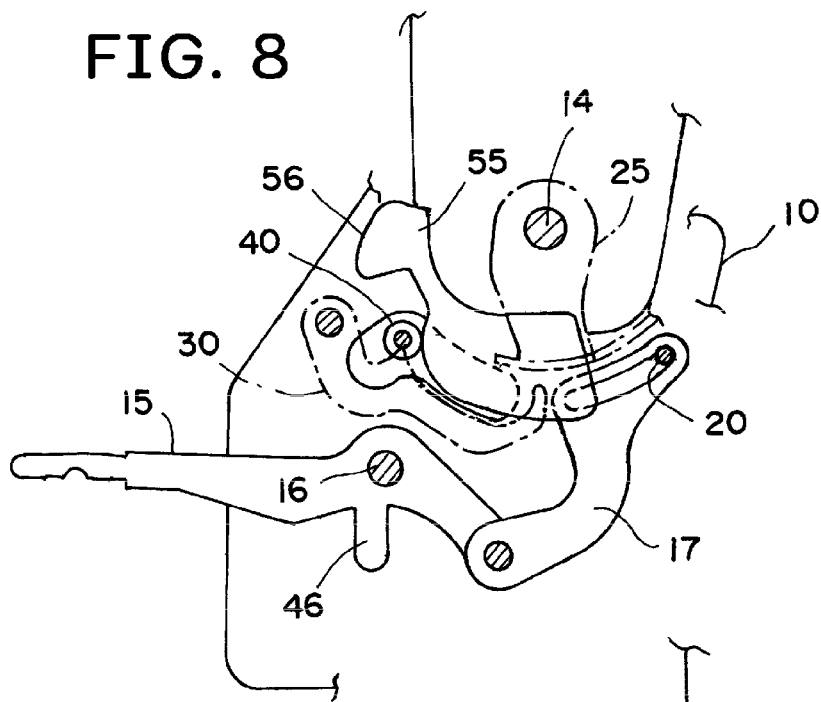
FIG. 8 is a side view illustrating a state in which the seatback is standing up.
Figure 9:
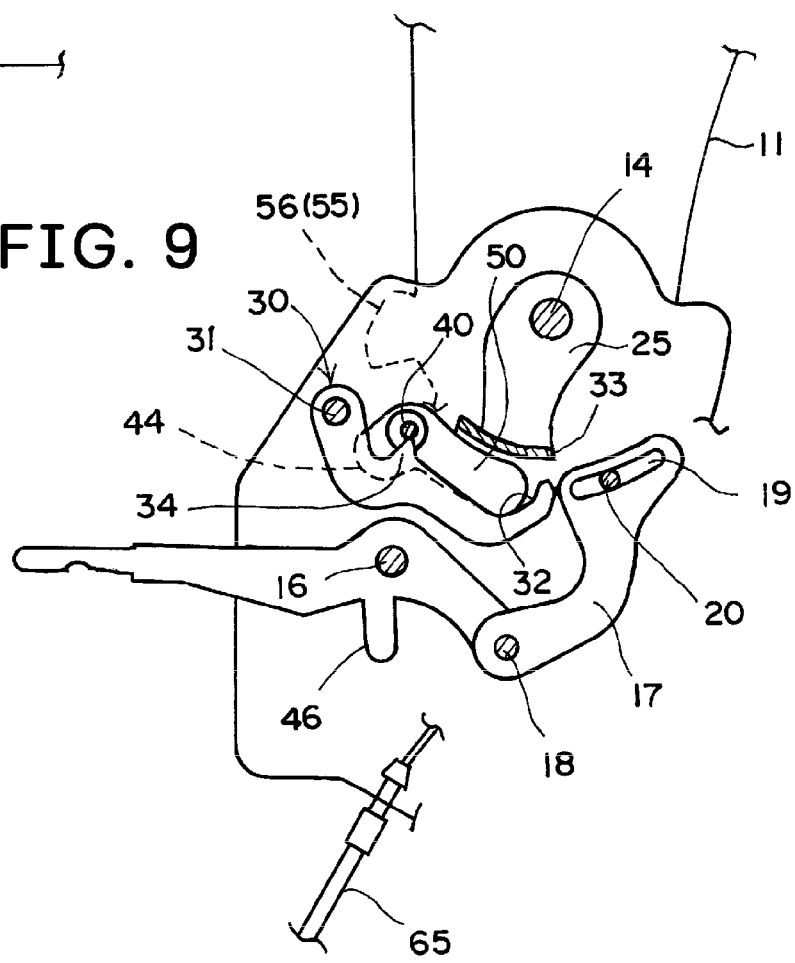
FIG. 9 is a side view illustrating a state in which a reclining mechanism of the vehicle seat is unlocked.

If the walk-in lever 67 is manipulated, the cable 65 is pulled such that the cable 65 may rotate the rotatable arm 25 leftward in FIG. 5, and the rotatable arm 25 rotates the center shaft 14 clockwise so as to unlock the reclining mechanism 4 (FIG. 9). In this case, since the reclining lever 15 is not manipulated, the shaft 20 moves in the slot 19 of the link lever 17 by the rotation of the rotatable arm 25, but the link lever 17 does not move and the reclining lever 15 also dose not move (FIG. 9). Therefore, although details will be described below, since the restriction protrusion 46 of the reclining lever 15 is not brought into contact with the operation restriction surface 45 of the switch lever 41, the switch operation portion 40 is positioned in the guide hole 50 of the bent hole 43.

If the seatback 3 is tilted forward from the seating position by the leftward rotation of the rotatable arm 25 (FIG. 10), the operation protrusion 56 of the abutting member 55 of the seatback 3 reaches the switch operation portion 40 and the operation protrusion 56 moves the switch operation portion 40 in the guide hole 50 of the bent hole 43 of the bottom bracket 10 rightward in FIG. 10 by the forward tilting of the seatback 3.

If the switch operation portion 40 moves rightward so as to pass the cam protrusion 34 of the memory lever 30 (FIG. 11), the memory lever 30 rotates by the elasticity of the spring 60 such that the memory hook 32 of the memory lever 30 is engaged with the unlock engagement surface 33 of the rotatable arm 25. If the memory hook 32 of the memory lever 30 is engaged with the unlock engagement surface 33 of the rotatable arm 25, the rotatable arm 25 is held at the position of the unlocked state and the seatback 3 tilts forward again. If the seatback 3 tilts forward to a walk-in position, the lock of the slide mechanism 5 is released and the whole seat advances, resulting in the walk-in state.

If the seatback 3 tilts forward to the walk-in position, thereby resulting in the state of FIG. 16, the switch operation portion 40 is positioned on the right side of the guide hole 50 of the bent hole 43, the returning protrusion 57 of the abutting member 55 is in contact with the switch operation portion 40, and the memory hook 32 of the memory lever 30 is engaged with the unlock engagement surface 33 of the rotatable arm 25. Since the slide mechanism 5 is still in the unlocked state, if the vehicle seat 1 is moved backward from the walk-in state, the vehicle seat 1 stops at a predetermined position and the slide mechanism 5 is locked.

Figure 17:
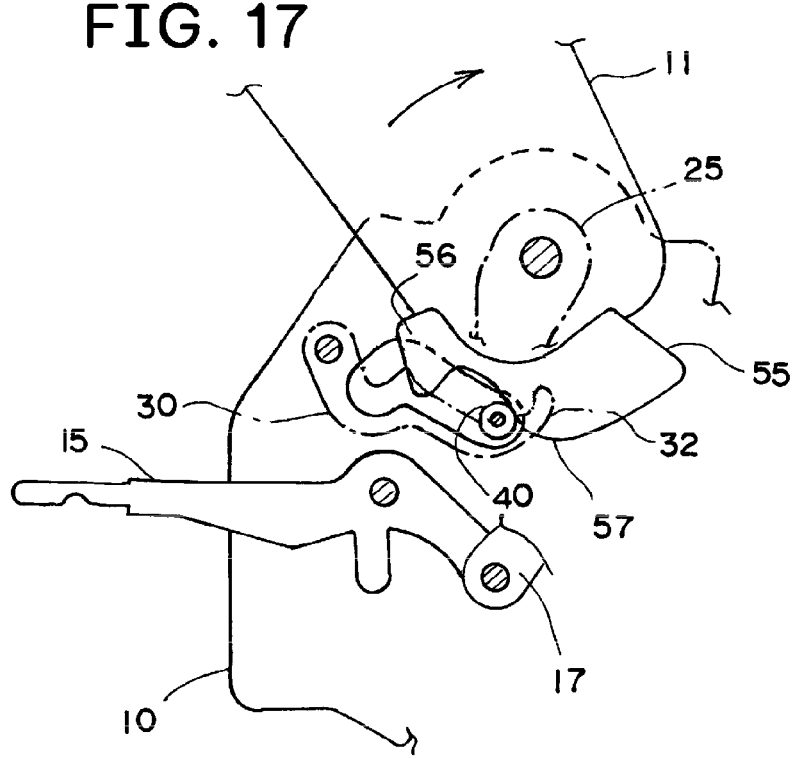
FIG. 17 is a side view illustrating a state in which the seatback is rotated slightly backward from the state of FIG. 15.

Next, if the seatback 3 is raised up, the returning protrusion 57 of the abutting member 55 moves the switch operation portion 40 in the guide hole 50 leftward from the state of FIG. 16 (FIG. 17). If the switch operation portion 40 moves leftward to pass the cam protrusion 34 of the memory lever 30 (from FIG. 11 to FIG. 10), the memory hook 32 of the memory lever 30 rotates downward against the elasticity of the spring 60 such that the memory hook 32 of the memory lever 30 is disengaged from the unlock engagement surface 33 of the rotatable arm 25.

If the memory hook 32 of the memory lever 30 is disengaged, the rotatable arm 25 rotates by the elasticity of the spring 62 to be the locked state. That is, when the switch operation portion 40 moves leftward to pass the cam protrusion 34 of the memory lever 30, the seatback 3 is raised up to a predetermined tilt angle, and the rotatable arm 25 rotates rightward such that the reclining mechanism 4 is locked to hold the tilt angle of the seatback 3. However, if the seatback 3 disposed at the walk-in state by the walk-in mechanism 6 is returned by using the reclining mechanism 4 without a memory mechanism, the seatback 3 can be returned to its original tilt angle. Installation is facilitated with the use of the economical reclining mechanism 4 and thus a reasonable configuration is achieved.

Figure 18:
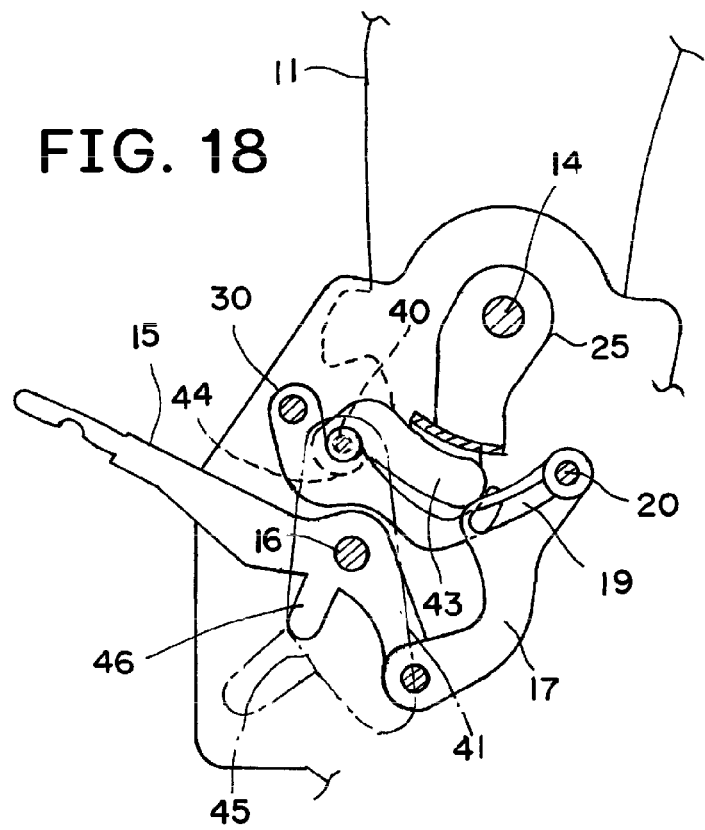
FIG. 18 is a side view illustrating a state achieved by manipulating a reclining lever of the reclining mechanism.

The operation of the walk-in mechanism 6 when the tilt angle of the seatback 3 is adjusted by the reclining mechanism 4 will now be described. If the reclining lever 15 is manipulated, the reclining lever 15 pulls the link lever 17 such that the inner circumference of the slot 19 of the link lever 17 is brought into contact with the shaft 20, thereby pull the shaft 20. Then, the shaft 20 rotates the rotatable arm 25 leftward in FIG. 18 such that the rotatable arm 25 rotates the center shaft 14 clockwise so as to unlock the reclining mechanism 4.

When the reclining lever 15 is manipulated, the restriction protrusion 46 of the reclining lever 15 is brought into contact with the manipulation restriction surface 45 of the switch lever 41, and the switch lever 41 rotates on the lever shaft 16 counterclockwise (from FIG. 5 to FIG. 18), and thus the switch operation portion 40 is fitted into the engagement hole 44 of the bent hole 43 of the bottom bracket 10.

Figure 19:
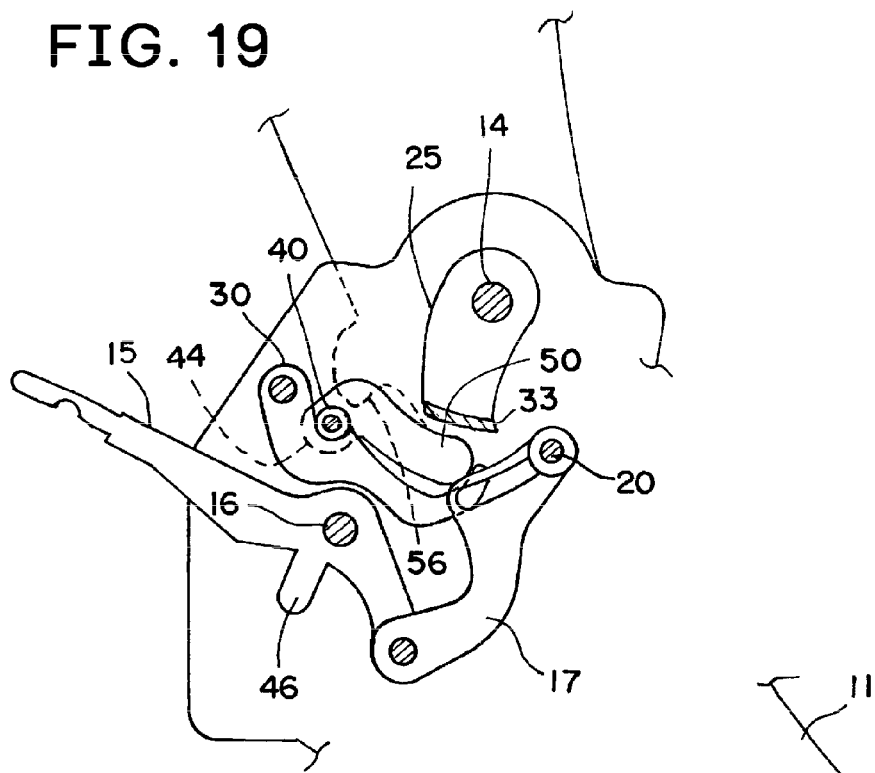
FIG. 19 is a side view illustrating a positional relationship between an operation protrusion and a switch operation portion in a state in which the seatback is tilted slightly forward.

Since the switch operation portion 40 leaves from a movement track of the operation protrusion 56 due to the forward tilting of the seatback 3 (refer to FIG. 19), the switch operation portion 40 always moves the memory lever 30 downward while the reclining of the seatback 3 is being adjusted, so as to prevent the memory hook 32 of the memory lever 30 from engaging with the unlock engagement surface 33 of the rotatable arm 25.

Figure 20:
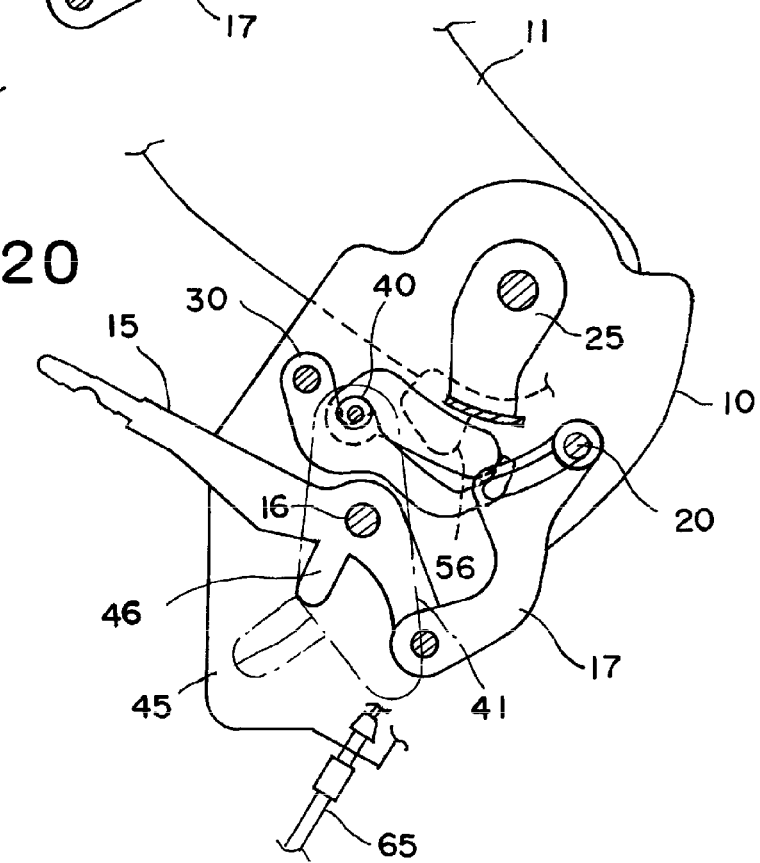
FIG. 20 is a side view illustrating a state in which the seatback is tilted forward.
Figure 21:
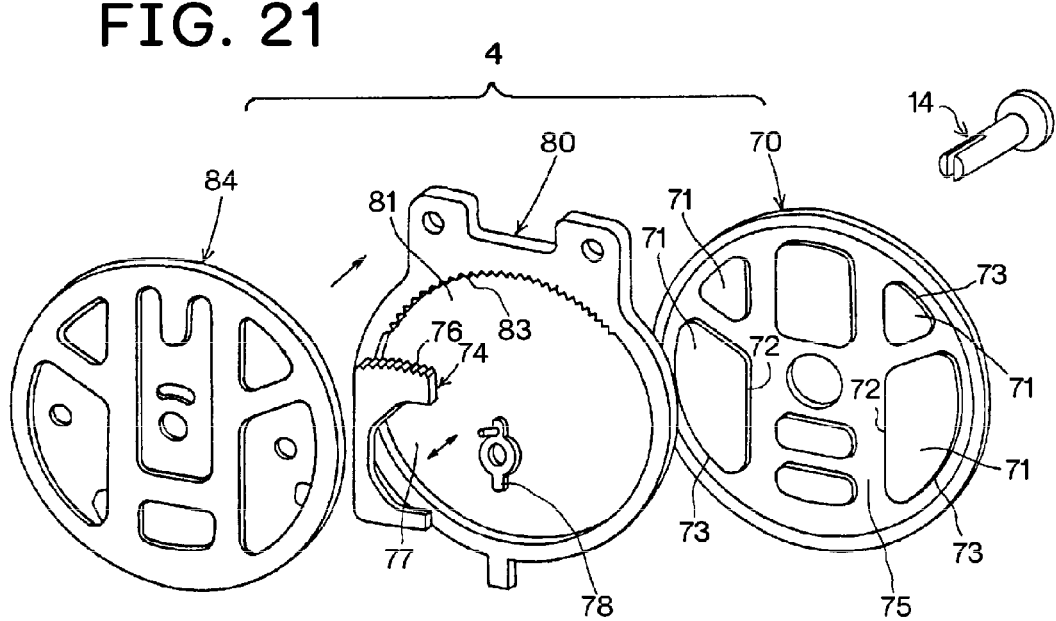
FIG. 21 is an exploded view illustrating the reclining mechanism.
Figure 22:
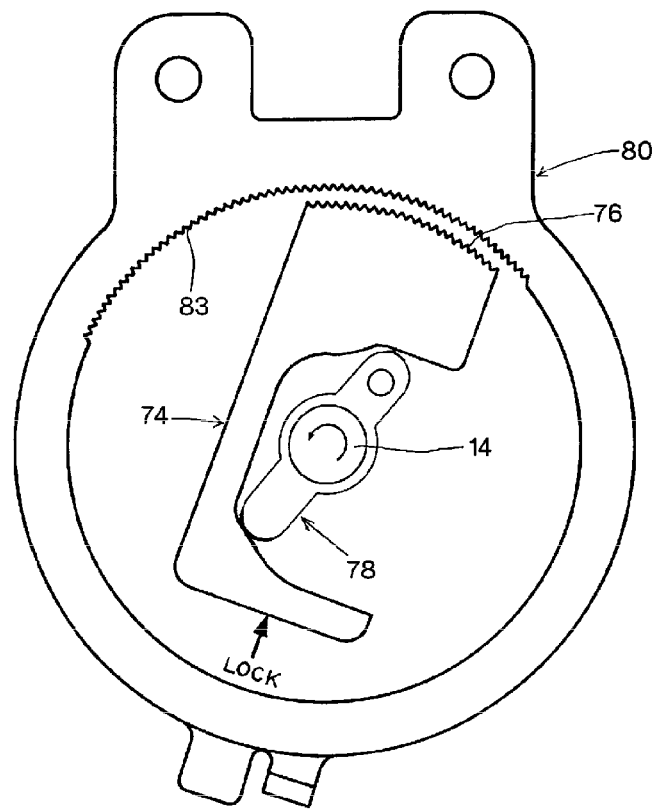
FIG. 22 is a side view illustrating the reclining mechanism.
Figure 23:
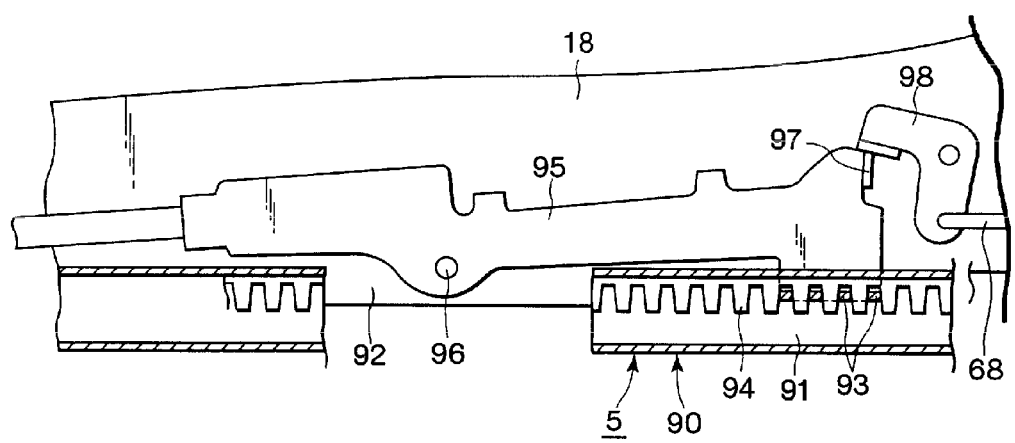
FIG. 23 is a side view illustrating a slide mechanism.

When the reclining mechanism 4 is in the unlocked state, if the seatback 3 is adjusted to be at a desired tilt angle and the reclining lever 15 is released, the rotatable arm 25 rotates to the right side of FIG. 20 by the elasticity of the spring 62, and the center shaft 14 rotates by the rightward rotation of the rotatable arm 25 so as to lock the reclining mechanism 4, thereby holding the seatback 3 at the desired tilt angle.

As described above, when the reclining lever 15 is manipulated, the reclining mechanism 4 is singly manipulated but the walk-in mechanism 6 is not operated. Therefore, even when the seatback 3 tilts forward, the slide mechanism 5 is not unlocked, failing to produce the walk-in position. Therefore, erroneous manipulation is prevented.

The invention claimed is:

1. A vehicle seat comprising:
   a seat bottom movable forward and backward by a slide mechanism;
   a seatback installed to the seat bottom to be adjustable in tilt angle on a center shaft by a reclining mechanism;
   the reclining mechanism configured in a manner such that an arc gear is formed at the inner circumference of a perfectly circular ring member, a lock member having a lock gear unit is provided on the inside of the ring member, the lock member is locked and unlocked in and from the arc gear by a cam unit, and the cam unit is configured to be engaged with and disengaged from the arc gear by rotation of the center shaft disposed inside the ring member; and
   a rotatable arm that is installed to the center shaft and rotates by manipulation of a reclining lever or a walk-in lever so as to unlock the reclining mechanism,
   wherein the reclining lever rotates the rotatable arm by a link lever having a slot,
   the walk-in lever is configured to be able to manipulate the rotatable arm independently of the reclining lever, and
   the slide mechanism is unlocked to advance the whole seat, resulting in a walk-in state when the walk-in lever is manipulated in a manner of tilting the seatback forward.

2. The vehicle seat according to claim 1,
   wherein the reclining lever is installed to a bottom bracket,
   the rotatable arm is connected to a cable transmitting the manipulation of the walk-in lever,
   the bottom bracket is provided with a memory lever which has a memory hook engaged with an unlock engagement surface of the rotatable arm to maintain an unlocked state of the reclining mechanism that is made by the rotatable arm,
   the memory hook is configured to be movable in and out of a movement track of the unlock engagement surface,
   the memory hook is engaged with the unlock engagement surface when the walk-in lever is manipulated, and
   the memory hook is caused not to be engaged with the unlock engagement surface of the rotatable arm by manipulation of the reclining lever.

3. The vehicle seat according to claim 2,
   wherein the seatback is provided with an abutting member including an operation protrusion that moves a switch operation portion when the seatback is tilted forward and a returning protrusion that moves the switch operation portion when the seatback is raised, and
   the abutting member is brought into contact with the switch operation portion such that the memory hook is disengaged from the unlock engagement surface at the time of walk-in.

4. The vehicle seat according to claim 2,
   wherein a cam protrusion is provided at a predetermined position of the memory lever, and
   the cam protrusion is configured to cause the memory hook to leave from the movement track of the unlock engagement surface when being brought into contact with a switch operation portion.

5. The vehicle seat according to claim 4,
   wherein the seatback is provided with an abutting member including an operation protrusion that moves the switch operation portion when the seatback is tilted forward and a returning protrusion that moves the switch operation portion when the seatback is raised up, and
   the abutting member is brought into contact with the switch operation portion such that the memory hook disengages from the unlock engagement surface at the time of walk-in.

6. The vehicle seat according to claim 5,
   wherein the rotatable arm always applies a force to the reclining mechanism to lock the reclining mechanism with use of a spring, and
   the memory lever always applies a force to the memory hook with use of a spring to cause the memory hook to engage with the unlock engagement surface.

7. The vehicle seat according to claim 2,
   wherein the memory lever is configured such that the memory hook is movable in and out of the movement track of the unlock engagement surface by a switch operation portion,
   the switch operation portion is provided at a leading end of a switch lever which is rotatably provided to the bottom bracket,
   the bottom bracket is provided with a bent hole in which the switch operation portion moves,
   the bent hole is formed to include a guide hole allowing movement therein when the memory hook is engaged with or disengaged from the unlock engagement surface and an engagement hole engaged with the switch operation portion to prevent the memory hook from being engaged with the unlock engagement surface, and
   the switch lever includes an operation restriction surface allowing movement such that the switch operation portion is engaged with the engagement hole of the bent hole by means of a restriction protrusion of the reclining lever.

8. The vehicle seat according to claim 7,
   wherein a cam protrusion is provided at a predetermined position of the memory lever, and
   the cam protrusion is configured to cause the memory hook to leave from the movement track of the unlock engagement surface when being brought into contact with the switch operation portion.

9. The vehicle seat according to claim 7,
   wherein the seatback is provided with an abutting member including an operation protrusion that moves the switch operation portion when the seatback is tilted forward and a returning protrusion that moves the switch operation portion when the seatback is raised up, and
   the abutting member is brought into contact with the switch operation portion such that the memory hook is disengaged from the unlock engagement surface at the time of walk-in.

* * * * *